(12) United States Patent
Livingston

(10) Patent No.: US 8,365,467 B1
(45) Date of Patent: Feb. 5, 2013

(54) PREVEGETATED BLANKET

(76) Inventor: Robert E. Livingston, Twin Lakes, WI (US)

(*) Notice: Subject to any disclaimer, the term of this patent is extended or adjusted under 35 U.S.C. 154(b) by 140 days.

(21) Appl. No.: 12/798,367

(22) Filed: Apr. 1, 2010

(51) Int. Cl.
*A01G 9/02* (2006.01)
(52) U.S. Cl. ........................................................ 47/65.9
(58) Field of Classification Search .............. 47/56, 65.9
See application file for complete search history.

(56) References Cited

U.S. PATENT DOCUMENTS

| | | | |
|---|---|---|---|
| 2,605,589 A | 8/1952 | Kuestner | |
| 2,632,979 A | 3/1953 | Alexander | |
| 3,850,862 A | 11/1974 | Clendinning et al. | |
| 3,890,910 A * | 6/1975 | Angruner | 111/200 |
| 4,067,716 A | 1/1978 | Sterrett | |
| 4,232,481 A | 11/1980 | Chamoulaud | |
| 4,941,282 A | 7/1990 | Milstein | |
| 5,205,068 A | 4/1993 | Solomon | |
| 5,226,255 A | 7/1993 | Robertson | |
| 5,765,304 A | 6/1998 | Clark | |
| 5,849,645 A | 12/1998 | Lancaster | |
| 5,860,245 A | 1/1999 | Welch | |
| 6,032,410 A | 3/2000 | Kumar | |
| 6,293,045 B1 | 9/2001 | Morgan | |
| 6,532,697 B2 * | 3/2003 | Egan | 47/56 |
| 6,658,790 B2 * | 12/2003 | Skuba | 47/56 |
| 6,694,670 B1 | 2/2004 | Egan | |
| 7,174,671 B2 | 2/2007 | Moore | |
| 7,452,445 B2 * | 11/2008 | Huang et al. | 162/72 |
| 2003/0056432 A1 * | 3/2003 | Prevost | 47/1.01 F |
| 2004/0202851 A1 | 10/2004 | Goodrum et al. | |
| 2004/0247399 A1 | 12/2004 | Kimberlin | |
| 2006/0107588 A1 | 5/2006 | Lee | |
| 2008/0163658 A1 | 7/2008 | Spittle | |
| 2011/0197523 A1 * | 8/2011 | Dubner | 52/173.1 |

FOREIGN PATENT DOCUMENTS

| | | |
|---|---|---|
| CA | 461018 | 11/1949 |
| DE | 1126 663 | 3/1962 |
| GB | 1 290 138 | 9/1972 |

\* cited by examiner

*Primary Examiner* — Kristen C Hayes
(74) *Attorney, Agent, or Firm* — Brie A. Crawford

(57) ABSTRACT

A prevegetated blanket protects an exposed soil surface from erosion in an efficient manner. The prevegetated blanket has a fibrous structure, with a water retaining composition, water retention substance and topsoil to receive the desired seeds. Components of the prevegetated blanket of this invention grow a living membrane for native and cover crops in a controlled environment in a weed free, state. Then, the prevegetated blanket is transferred to a specific site and installed immediately after soil is prepared.

11 Claims, 7 Drawing Sheets

PREVEGETATED BLANKET

This invention relates to a prevegetated blanket and more particularly to a prevegetated blanket to protect an exposed soil surface from erosion in an efficient manner.

BACKGROUND OF THE INVENTION

In any construction procedure, soil erosion is usually a major problem. With soil erosion, prevention is always easier than correction. Many ways are known in the prevention of soil erosion. In soil areas, with vegetation growing, the root system of the plants can prevent erosion. So, the faster root growth can occur in area, the more likely it is that soil erosion can be prevented, or at least minimized.

Current erosion treatments are carried out after the site is graded and seed is applied. A site-specific seed type and cover crop are applied by broadcast seeding, slip seeding, drill seeding, or hydro seeding. With favorable weather conditions or supplemental watering in controlled increments, the seed source may start to establish once within three or four weeks. The soil can then be stabilized with the living plants. In the meantime, this practice has a great problem for causing soil loss by erosion, due to the period of no vegetation and lack of emerging root growth.

Typical seeds for cover crops include, but are not limited to annual rye, fescue and spring oats. Seeding generally takes longer to establish the root system to minimize or prevent erosion. Those plans usually require two or three growing seasons for maturity and the establishment of good ground cover. In normal practices, job site and outside conditions affect the success of seed growth. Heavy rain or hot climates can cause the seed or soil to erode without proper maintenance.

In extremely difficult climates, additional water and herbicide treatments are necessary to establish the seed and create a root base to minimize erosion. If the site is already suffering from damage such as erosion problems, additional soil and seed applications may be necessary. Such actions add greatly to the expense of erosion prevention.

Soil customarily contains tremendous amounts of seed sources, that produce weeds. Once the soil is disturbed, new annual weeds will begin to germinate, and overtake a cover crop and the native seed source. Weeds are very undesirable. Avoidance of a weed crop is very desirable. Quick growth of desired vegetation is a very desirable method of avoiding a weed crop.

Currently, live plugs, that is small pieces of desired vegetation, are the only way to get an immediate vegetation coverage, which can compete with weed seeds. Planting the live plugs is labor-intensive. The plugs themselves are also costly. Then the maintenance of the plugs is a problem.

Additionally, because of short growing seasons in the upper Midwest, this success of the native species and its growth will be shortened. It will therefore take more growing seasons to have any native species function as the erosion-preventing ground cover. In that case, treatments to prevent extreme weed competition can include controlled burns or herbicides. Such treatments can cause more problems than they solve. A controlled burn requires a fire department presence for reasonable safety. Herbicides have environmental consequences, even with careful application thereof.

Normally when exposed soil is to be seeded the grade, a seed type is applied by either broadcast or hydro seeded from that point. But at application, the specified seed is just that, seed. It has not developed into an erosion preventing plant. Thus, it usually will take a three to four week period, under good growing conditions, to see a cover crop come up. Seed generally takes longer to establish than living plants to take hold and root.

Also, a seeding process is usually fighting many uphill battles. Inclement weather types, such as heavy rains, extreme heat or both, cause seeds fight a losing battle in the attempt become rooted or sprouted in the desired. Even under an erosion control blanket, seeds still have those problems. If the construction site is already wet or has a fast unpredicted rise of water flow, because of urban run off or naturally occurring stream rising or falling, it creates an additional uphill battle for seeds. Other problems for seeds include spikes in runoff or rain fall directly or usually prevent full establishment of the seed.

The seeding process, which was originally designed to take two to three days, now requires much more labor and tremendous efforts to redo. Nevertheless, that which was originally installed, now requires constant maintenance; such as adding new soil, reseeding, using additional water or re blanketing. Blanketing applies a cover to seeds, as a special erosion control measure. These operations add a tremendous additional expense as well. If the project is successful for normal operation standards, still weed treatments such as herbicides or cutting must be done to allow access for Native foliage to grow. Then, in most of the United States, the summer heat moves in at the end of June through September 15. Native foliage becomes succulent and young; and cannot fight the annual weed competition.

Such plantings are not acceptable and will get the appropriate signing off as successful by permitting authority as well as engineers or the contractor. General contractors and the subcontractors cannot get finished pay outs, thereby restricting cash flow and causing more maintenance to get acceptance of success.

While this may seem odd, under normal practices, this is usually how commercial jobs operate. Because of unit costs up front, installation prices per unit are very expensive. It is the way this is done. No appropriate solution is available.

Additionally, one must factor in monitoring the site, herbicide treatments, watering regimens and top dressing or even reseeding, the true price per unit is high and still may take years to see true success. In the interim, soil loss and natural waterways, wetlands, or other areas are polluted. Remedies therefor occur at a large cost. Compounding daily across the United States is a large scale environmental problem from non source point pollution.

It is very necessary to create an alternative process to limit loss exposure and create situations to have a better chance of success; such success including, but not limited to, reduced overall herbicide use and limited chances of storm events to compromise a sight to see credible changes in plant community establishment faster and protect our environment. To that end, it is very desirable to have an efficient method of getting desired vegetation in a desired place at a desired time. It is furthermore valuable to be able to control erosion and produce native grass or turf grass on difficult sites or erodible soils, quickly and efficiently with reduced labor in maintenance requirements.

Attempts to solve some of these problems with vegetated blankets can also be a problem. It is difficult to produce a proper blanket for control of erosion. Not only that, it is difficult to move the blankets to a desired location. Then application of the blanket to the desired surface can be complicated and difficult.

SUMMARY OF THE INVENTION

Among the many objectives of the present invention is the provision of a prevegetated blanket providing desired seeds and low maintenance to a desired area of erodible soil.

Another objective of the present invention is the provision of a prevegetated blanket, which is easily maintained.

Yet another objective of the present invention is the provision of a prevegetated blanket, which minimizes environmental damage.

Still another objective of the present invention is the provision of a prevegetated blanket, which provides for at least reduced herbicide treatment.

A further objective of the present invention is the provision of a prevegetated blanket, which uses minimal water.

A still further objective of the present invention is the provision of a prevegetated blanket, which minimizes erosion.

Yet a further objective of the present invention is the provision of a prevegetated blanket, which provides for no herbicide treatment.

Also an objective of the present invention is the provision of a prevegetated blanket, which provides for minimal herbicide treatment.

Another objective of the present invention is the provision of a prevegetated blanket, which is easily transported.

Yet another objective of the present invention is the provision of a prevegetated blanket, which is easily installed.

These and other objectives of the invention (which other objectives become clear by consideration of the specification, claims and drawings as a whole) are met by providing a prevegetated blanket having a fibrous structure, with a water retaining composition or a water retention substance and topsoil to receive the desired seeds; all components thereof being preferably impregnated therein.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Figure 1:
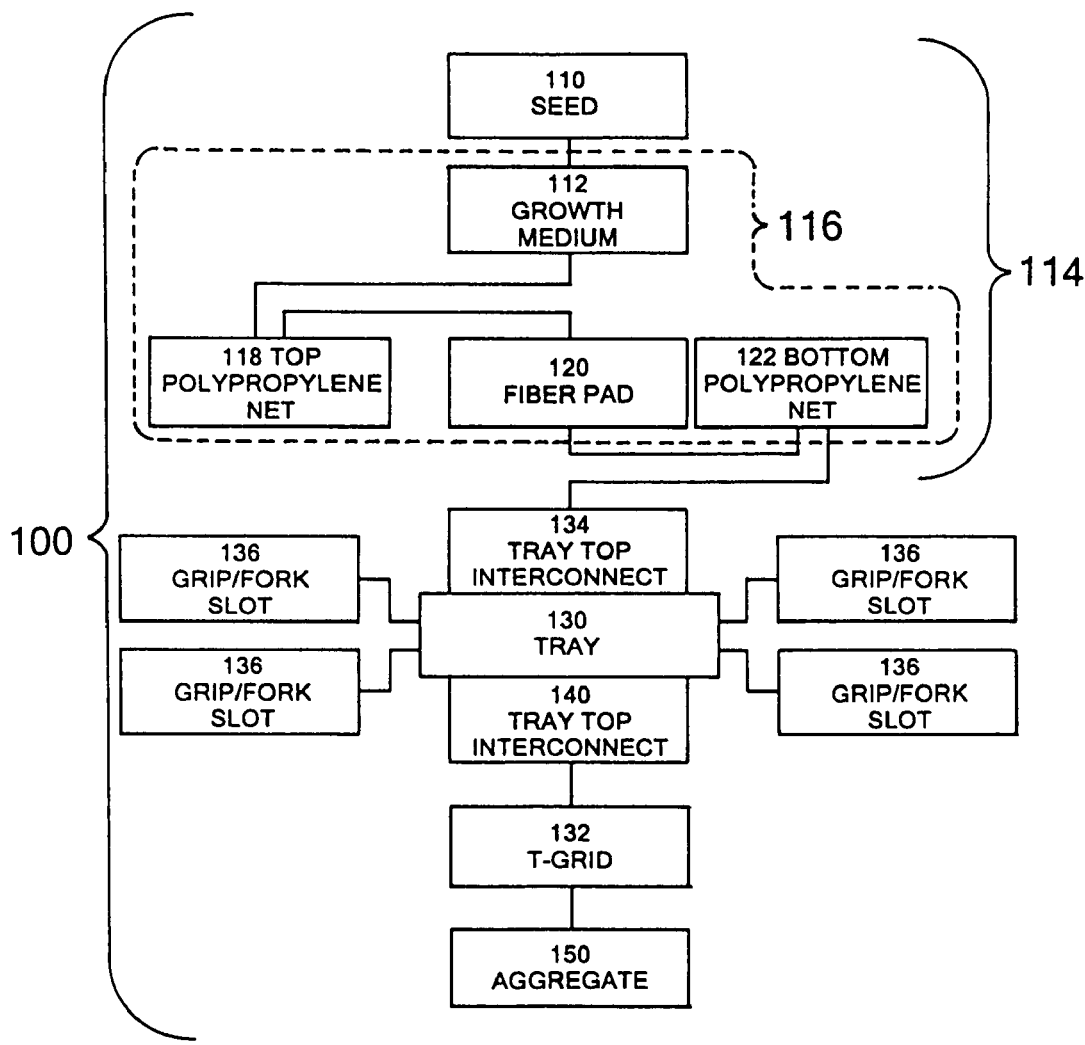
FIG. 1 depicts a box diagram of the structural assembly 100 of this invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

Components of the prevegetated blanket of this invention prevent erosion and grow a living membrane for native and cover crops in a controlled environment in a weed free state. Then the prevegetated blanket is transferred to a specific site and installed immediately after soil is prepared. By the end of a day, a living plant matrix is installed. Roots will be established in the soil within about two days of blanket installation, because the roots already exist. Plant heights will vary on species but are usually about 7.6 centimeters (three inches) to 15.2 centimeters (six inches) tall upon installation and provide an immediate good cover crop.

Weed seeds are not exposed to sun and are covered, thereby at least substantially reduced as a living crop. In fact, weeds can now be kept to a dormant state. Now watering by mother nature gently or violently will now reduce erosion by 50 percent conservation upon installation:

This process uses erosion control standards in place of standards followed across the country, by engineers utilizing other controlled conditions. Then solar heat and sun, organic watering along with standard growing medium or growth media, such as top soil, and neutral root media permit plants to thrive. They are also cost effective and provide at least eighty percent (80%) cover. Thus, these are living plant communities born to prevent erosion.

A substrate receives a growth medium or a topsoil layer and desired seeds. Preferably, the substrate is a fibrous, non-woven substrate, or a fiber pad. Such substrates are known as erosion control blankets. At least one net layer supports the substrate and keeps desired materials therein or thereon. The net layer may be polyethylene, polypropylene, or another suitable polymer, or copolymers thereof. A polypropylene net appears to be more durable and is preferred. Even more preferred is to have the net be of biodegradable material. The net, with its lines and openings, provide structure and strength for the prevegetated blanket, without interfering with the purpose thereof.

The prevegetated blanket utilizes significantly less top soil that previous, conventional methods. Due to the reduction in the amount of top soil, the prevegetated blankets weigh significantly less and can be potentially carried to job sites where vehicles can travel. For example, a vehicle may not be able to reach near the edges of ponds that have a steep downhill grade toward the pond. In this environment, the ground may be soft and watery and the vehicle may risk getting stuck. The lighter prevegetated blanket can be carried to the desired location and installed thus alleviating this potential problem.

Moreover, more of the present, lighter prevegetated blankets, measured in square meters, even when covered, can be legally carried on a semi truck or trailer and transported to a job site. Thus, reducing the number of trips between the greenhouse or other growing facility and the installation site. Finally, previous blankets tended to shrink between the process of cutting, transporting, and installing at the job site. The present prevegetated blankets do not shrink during this process and thus, even more square feet of surface coverage can be transported and installed at a job site on a single semi truck or trailer.

In previous methods, 2.5 centimeters (1 inch) to 3.8 centimeters (1.5 inches) of dry weight of growth medium such as peat or top soil is utilized. However, in the present invention, 0.3 centimeters (⅛ inch) to 1.9 centimeters (¾ inch) of growth medium such as top soil is used. In the preferred embodiment, no more than 1.3 centimeters (½ inch) of growth medium such a top soil is used.

The following is intended as an illustrative example of the great weight reduction provided by the present invention. In the present invention, live blankets containing 3.34 square meters (36 square feet) of material weigh between 36.29 kilograms (80 pounds) and 56.7 kilograms (125 pounds). In previous methods, sod blankets containing 0.93 square meters (10 square feet) of material weigh 36.3 kilograms (80 pounds) to 38.56 kilograms (85 pounds). For a direct comparison of the approximate weight difference between the previous and present methods, the previous embodiment weights must be multiplied by 3.6 to account for the difference in square meters. For the same amount of material, the previous blankets weigh between 130.63 kilograms (288 pounds) and 138.8 kilograms (306 pounds).

Also, previous methods were severely limited as to the type of plant they are able to grow and transport to installation sites. Previous methods were substantially limited to Kentucky Bluegrass, Ryes, Fescues, Bent Grasses, and Bermuda Grasses. In contrast, the present invention is nearly unlimited as to the plants, seeds, grasses, or bulbs that can be grown, transported and installed. The present invention can handle Kentucky Bluegrass, Ryes, Fescues, Bent Grasses, and Bermuda Grasses. Also, the present invention can grow, transport, and install an unlimited variety of other seeds and plants. Some examples include, but are not limited to, sedges such as Prairie Sedges, Bristly Sedge, Fox Sedge, and Fringed Sedge, native grasses such as Sweet Grass, Indian Grass, Wood Reed Grass, and June Grass. The present invention can also handle wet mesic plant varieties, woodland grasses, prairie plants, wildflower, and annuals. This list, for the present invention, is intended to illustrate the wide variety of seeds that can be grown, transported, and installed with this invention. However, it by no means is intended to limit the present invention to these seeds alone.

Referring now to FIG. 1, structural assembly 100 has seed 110 and, in certain cases plant plugs, applied to a fiber pad or fibrous substrate 120. Fiber pad and fibrous substrate 120 are used interchangeably throughout the application but refer to the same component. Between the seed 110 and fiber pad 120 are applied a growth medium 112, such as top soil, and top net 118, preferably of polypropylene. Fiber pad 120 has the top net 118 on a top surface thereof and a bottom net 122, preferably of polypropylene, on a bottom surface thereof to form a static prevegetated blanket 116. This structure, by adding seed 110 to the fiber pad 120, with the additional application of a growth medium 112, forms a live blanket 114 of the prevegetated blanket 116. Fertilizer may also be applied to the seed mix 110 to aid in growth.

Growth medium 112 can be a variety of substances and any suitable substance for providing nutrients and a proper growth environment for the plants. In one embodiment, the use of top soil can be substantially limited as to reduce the weight of the live blanket 114 during transport and installation. Thus, the live blanket 114 can be installed in places that are hard to reach by truck or trailer 210. In other embodiments, some suitable examples of growth medium 112 include top soil, sphagnum, vermiculite, or a pre mixed growing media. Vermiculite and similar materials are very useful for water retention in the live blanket 114. Many of these growth mediums 112 are sold in bulk compost soils establishments and starter nutrients. As can be clearly seen, there are great flexibility and advantages in the use of growth medium 112.

In the preferred embodiment, fibrous pad 120 is 4 millimeters (0.157 inches) to 14 millimeters (0.551 inches) thick. In a more preferred embodiment, fibrous pad 120 is 5 millimeters (0.197 inches) to 13 millimeters (0.512 inches) thick. In the most preferred embodiment, fibrous pad 120 is 6 millimeters (0.236 inches) to 12 millimeters (0.472 inches) thick.

Figure 2:
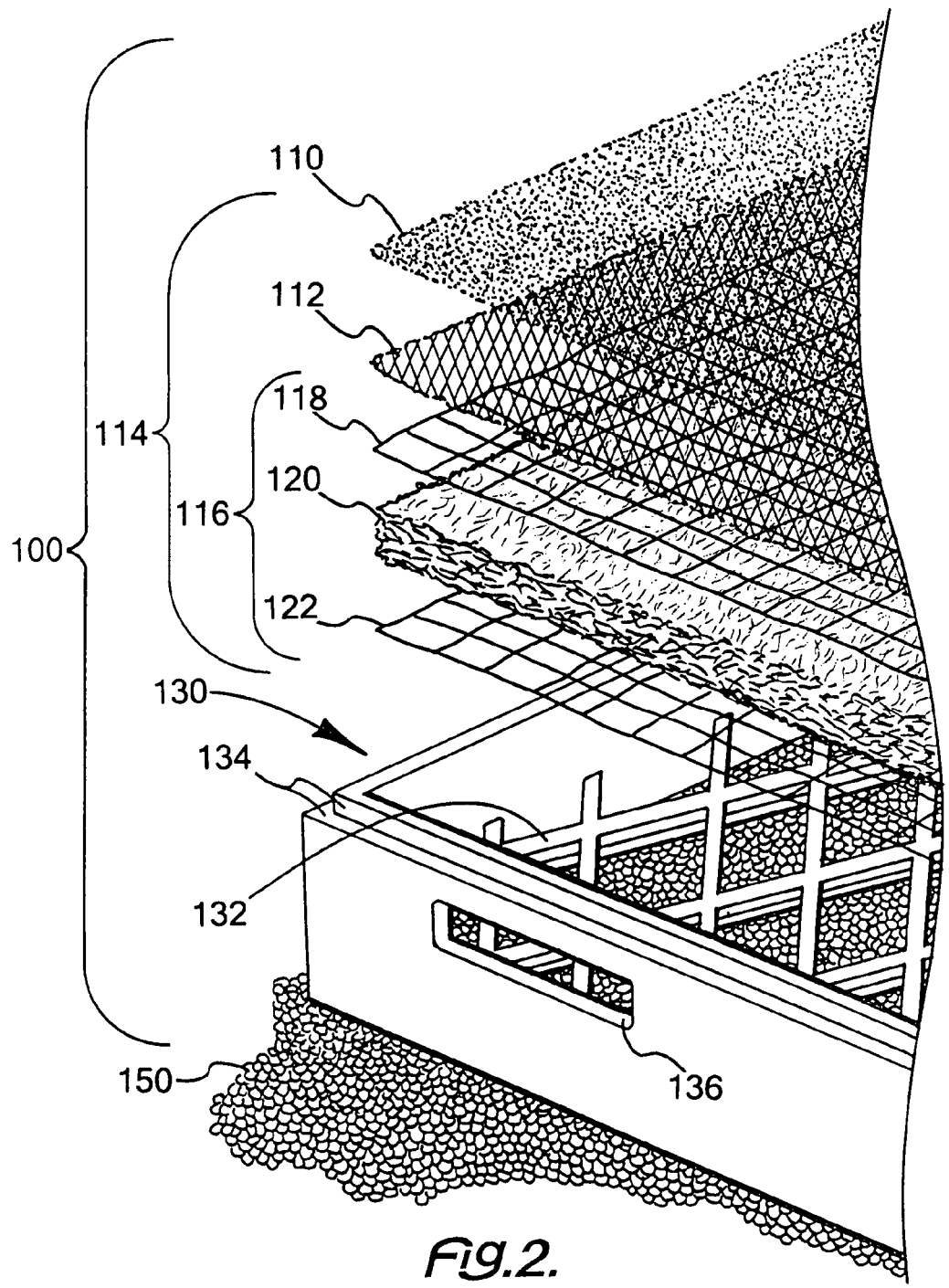
FIG. 2 depicts an exploded, perspective view of the structural assembly 100 for the prevegetated blanket 116 of this invention.
Figure 3:
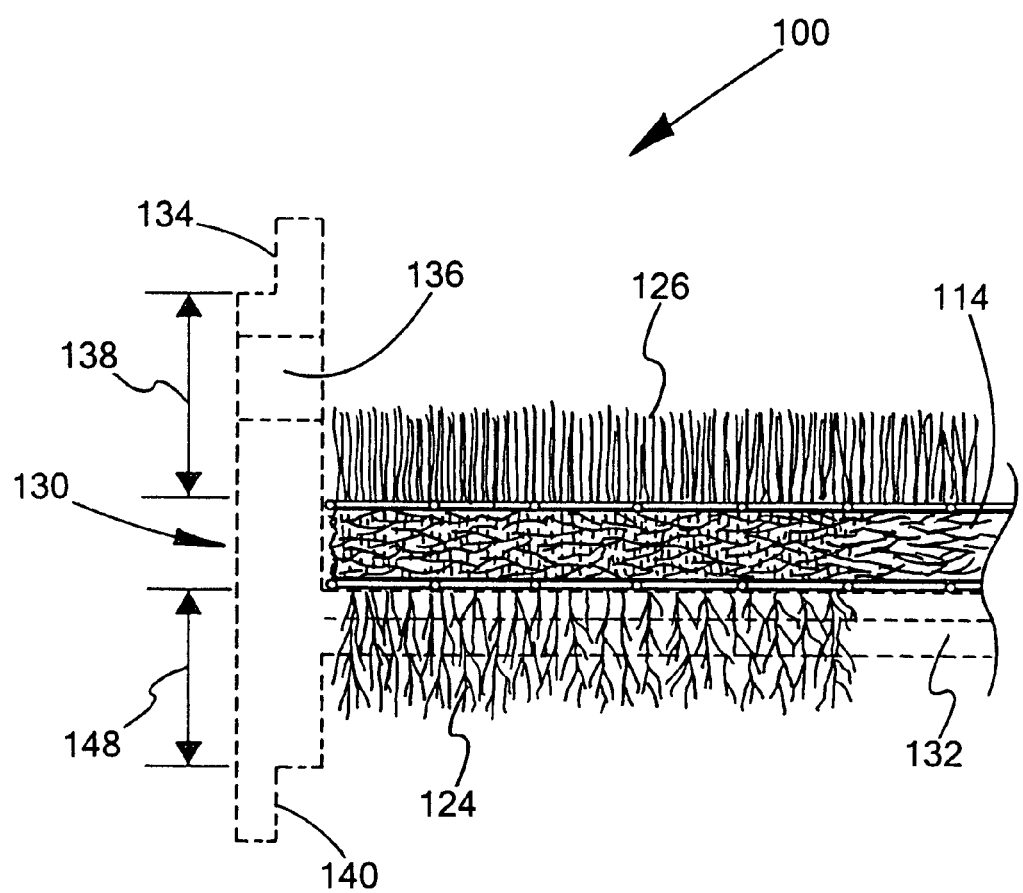
FIG. 3 depicts a side, cross-sectioned view of the prevegetated blanket 116 of this invention, based on FIG. 2.

Adding FIG. 2 and FIG. 3 to the consideration, support for the live blanket 114 comes from a tray support, preferably in the form of tray or tray support 130. Tray 130 is a rectangular or square open tray with edges and a t-grid 132 at a bottom portion thereof for support of live blanket 114. At a top edge of tray 130 is a top tray interconnect 134. Within a side of tray 130 is a grip slot 136. Grip slot 136 provides for lifting tray 130 or a stack thereof manually, or with a forklift or suitable device (not shown). T-grid 132 is low enough in tray 130 to provide a growth space 138 for grass 126 of live blanket 114.

Top tray interconnect 134 cooperates, preferably in a male to female relationship, with a bottom tray connect 140 on a bottom edge thereof in order to permit nesting or stacking of a plurality of trays 130. Top tray interconnect 134 cooperates with a bottom tray connect 140 to provide a stable stack or nestable stack of trays 130. T-grid 132 is spaced from a bottom of tray 130 in order to provide a root space 148, for roots 124, between a pair or a plurality of stacked trays 130.

The tray 130 may be supported on a supply of smooth aggregate 150 (FIG. 2), which can also serve as a water retaining substance, as the live blanket 114 is assembled therein. However, vermiculite and similar substances are the preferred water retaining substance. Alternatively, the live blanket 114 may be assembled as a larger structure and cut to fit the tray 130. The aggregate 150, with the T-grid 132, supports the live blanket 114. The watering of the live blanket 114 may be facilitated thereby.

Figure 4:
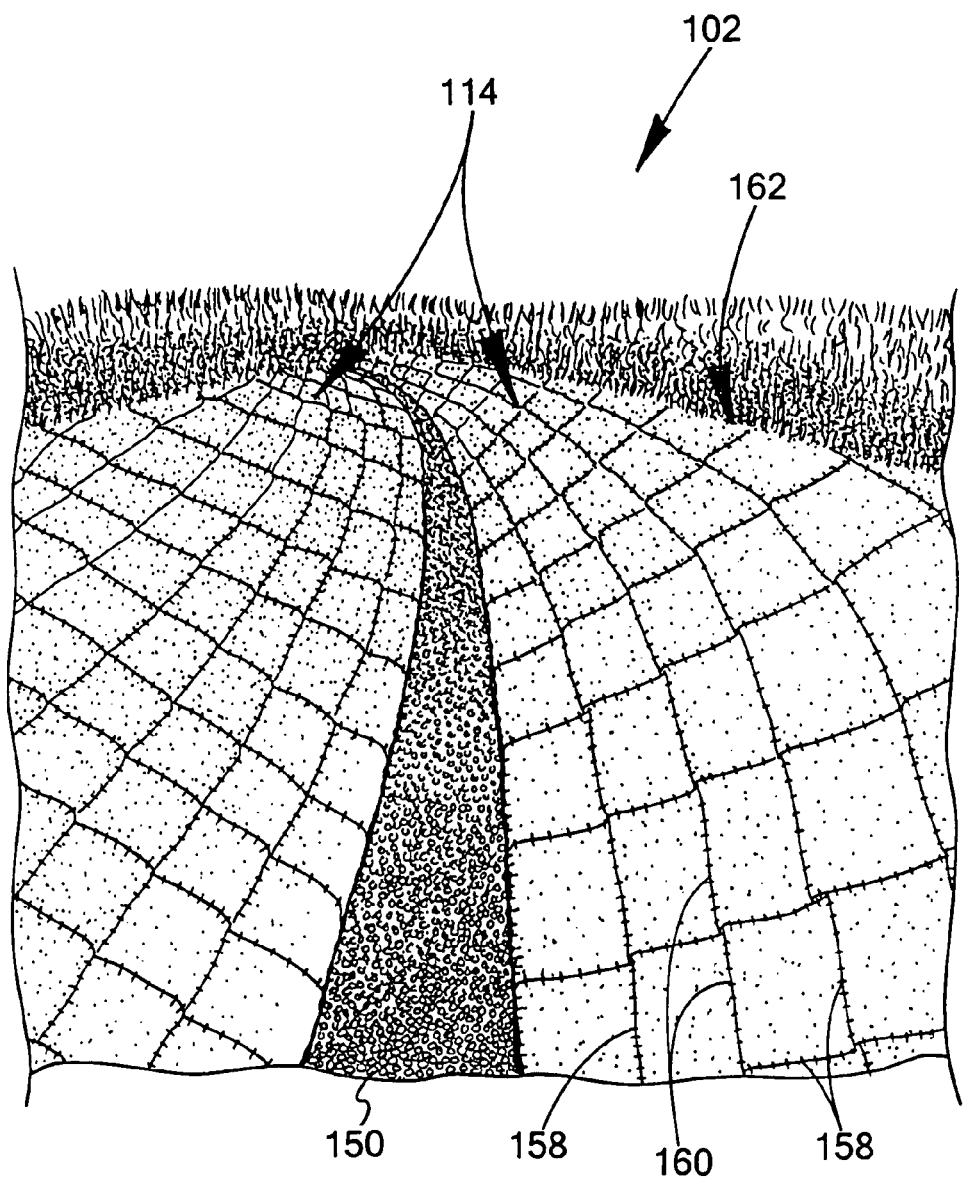
FIG. 4 depicts a perspective view of the structural assembly 100 of this invention on a site 102.

With the further consideration of FIG. 4, use of a series of the live blankets 114 becomes clear. Root space 148 (as shown in FIG. 3) is provided on site 102. Staples 158, preferably of the landscape type, support the series of live blankets 114 in a desired position. At the edge of each live blanket 114, which adjoins another live blanket 114, is an overlapped edge 160 of the series of live blankets 114. Such overlapping encourages water to run down the live blanket 114, without eroding the same. At the edge of site 102 is a tucked edge 162 of the series of live blankets 114, which does not adjoin another live blanket 114.

Figure 5:
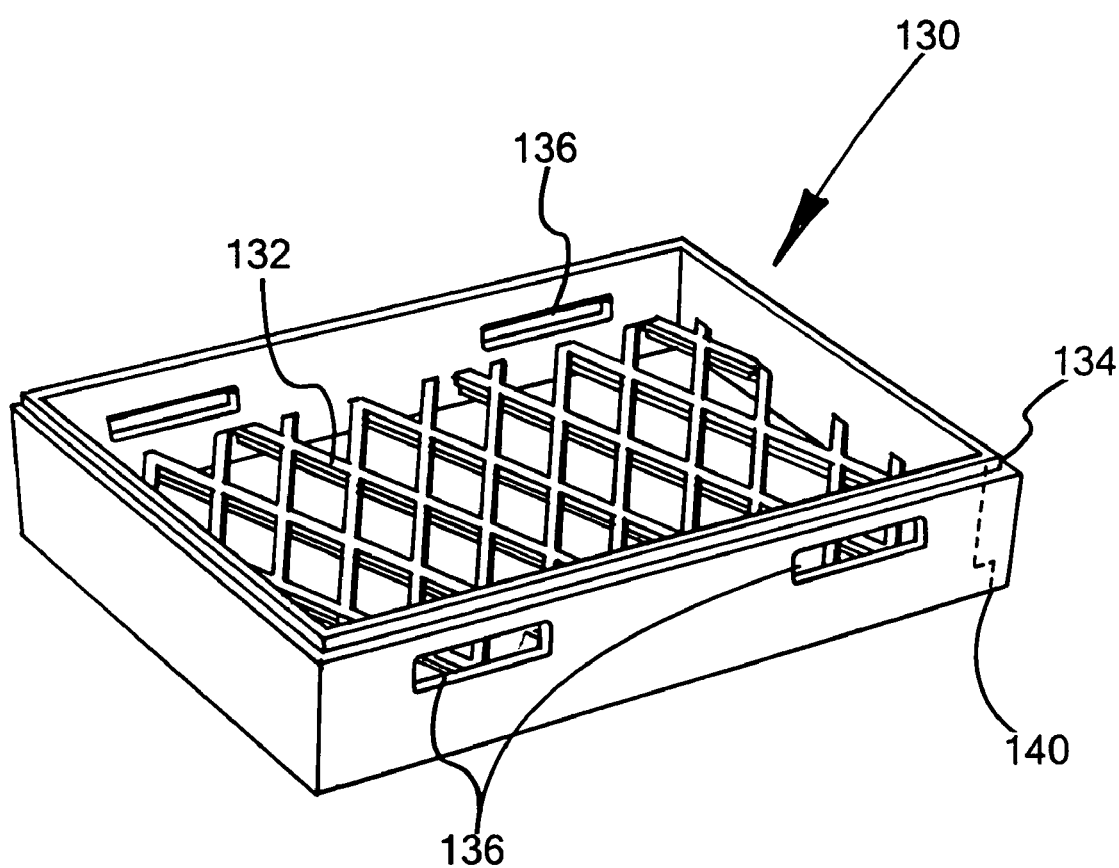
FIG. 5 depicts tray 130 for the structural assembly 100 of this invention.

Now adding FIG. 5 to the discussion, tray 130 has t-grid 132 near a bottom portion thereof, to support live blanket 114. At a top portion of tray 130 is top tray interconnect 134. Top tray interconnect 134 serves as the male portion of the nesting capability for a stack of trays 130. Bottom tray connect 140 (FIG. 3) serves as the female portion of the nesting capability for a stack of trays 130 in cooperation with top tray interconnect 134. Grip slot 136 permits manual or forklift (not shown) lifting of tray or trays 130.

Figure 6:
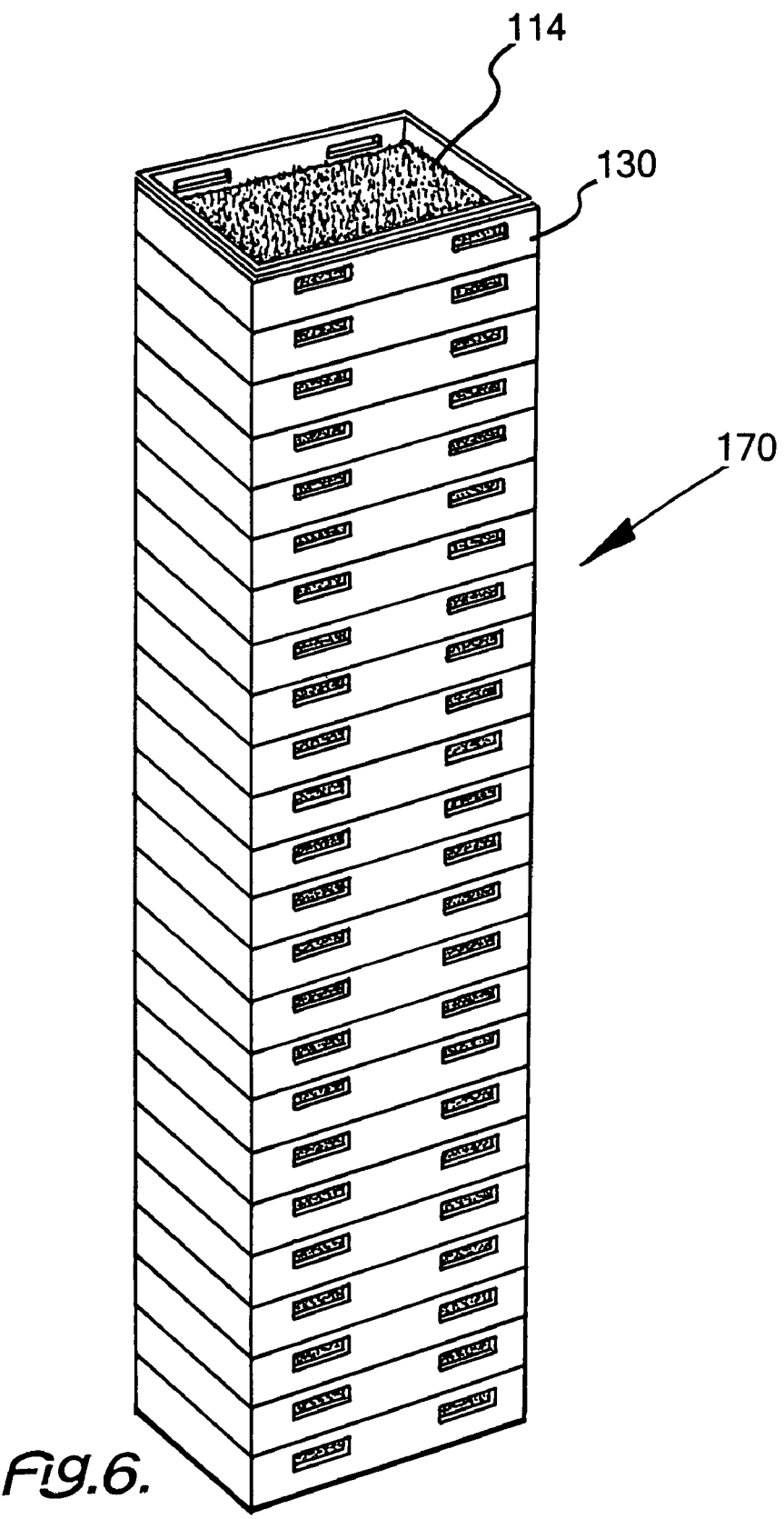
FIG. 6 depicts tray 130 for the structural assembly 100 of this invention as storage stack 170.
Figure 7:
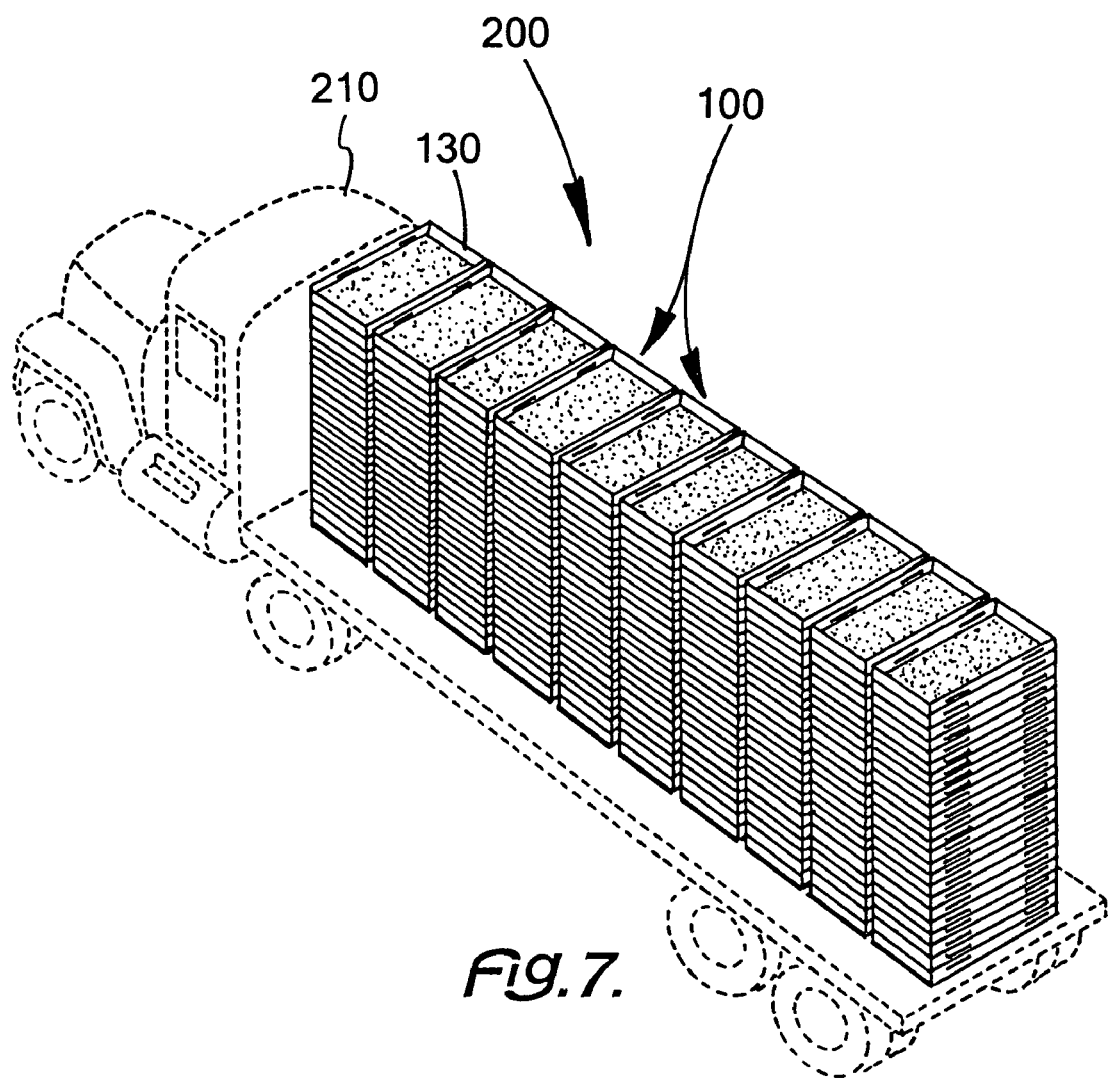
FIG. 7 depicts tray 130 for the structural assembly 100 of this invention as transportation stack 200, on truck 210.

Stacking advantages become even more clear with the consideration of FIG. 6 and FIG. 7. Live blanket 114 within tray 130 can be stacked for storage or transport. Storage stack 170 of 24 trays 130 is shown in FIG. 6. Transportation stack 200 shows a load of a plurality of trays 130 in a series of stacks of ten trays 130 on truck 210. The nesting capability for a stack of trays 130 is thus illustrated. Once installation of the live blanket 114 at a job site is complete, empty tray 130 is returned to the original greenhouse or other growing site and is reused and recycled for future blankets 114.

Stacking of trays 130 on truck 210 has added benefits. The upper trays 130 protect the live blankets 114 in lower trays 130 from heat, sun, wind, and other environmental conditions. Stacking of trays 130 especially helps protect roots 124 from drying and destroying live blanket 114. Stacking of trays 130 offers great advantages and flexibility in transportation and installation of live blankets 114.

Within the current national and stated standards and practices for preventing erosion, growing a living prevegetated erosion control blanket will increase the establishment of a native plant source or cover crop. By using this live blanket 114, weed seeds will remain dormant. Also, erodible soils will be reduced by fifty percent, and the vegetative cover will be increased by eighty percent.

The process of growing the prevegetated blanket is designed using existing erosion control components and standards currently in place in a controlled environment. By using specific existing growing media in a non-soil hydroponics root mass with this prevegetated blanket, vegetation and root stabilization takes two to three weeks as desired. This very compressed system greatly reduces erosion.

A variety of components are suitable for use for the prevegetated blanket. Preferred components of the prevegetated blanket are as follows:

(1) Aggregate: Stone smooth, round, with a diameter of about 0.6 centimeter (0.25 inch) to 2.5 centimeters (0.75 inch) to prevent root growth resistance.

(2) Erosion control blankets are fibrous substrates or blankets of vegetable fibers. Typical such blankets include, but are not limited to the following commercially available blankets: C125 core fiber blanket, DC 250 double net coconut or core blanket, MC 250 double net core matrix blanket, C32 core fiber blanket, TRM C 350 turf reinforcement core matrix blanket and a bio D SCF 30 core stitched blanket with photo degradable netting.

(3) Growing Medium: Sphagnum for organic matter, vermiculite for water retention or water retaining substance and topsoil for seed or a pre mixed growing media. These growth mediums are sold in bulk compost soils establishment and starter nutrients.

(4) A seed cover crop including but not limited to wildflower mix, pure mesic, native, herbs, now mow turf, fescue, annual or perennial rye may be used.

Depending upon the blanket application, supplemental plant plugs may be used. The application of the prevegetated blanket will determine the seed source used.

Manufacturing or growing procedures for the prevegetated blanket include:

Step 1: Growing Area Preparation for the blanket.

An aggregate base having a thickness between 10 centimeters (four inches) and 33 centimeters (twelve inches) is used. This prevents weeds from germinating up through the aggregate base.

Step 2: Blanket Preparation.

An erosion control blanket between about 2.4 meters (eight feet) wide and 34.1 meters (112 feet) in length are laid out on top of the aggregate. A growing or growth medium or media are then preferably applied on the surface of the blanket at a thickness of about 0.5 centimeter to about 4 centimeters. More preferably, the growing or growth medium or media is applied on the surface of the blanket at a thickness of about 0.5 centimeters to about 3 centimeters. Most preferably, the growing or growth medium or media is applied on the surface of the blanket at a thickness of about 0.5 centimeters to about 1.5 centimeters. Most desirably preferred is thickness of about 1.0 centimeters (0.375 inch). The desired seed mix is then applied on the surface of the growing media. After seed, fertilizer is then applied.

Step 3: Growth Period.

Once the components are installed on the aggregate, the prevegetated blanket is then preferably watered at a rate of about of 1 liter to 3 liters per square meter. More preferably, the prevegetated blanket is then preferably watered at a rate of about of 1.5 liters to 2.5 liters per square meter. Most preferably, the prevegetated blanket is then preferably watered at a rate of about of 1.7 liters to 2.1 liters per square meter. Continued watering depends on the seed applied, anywhere from two liters to 3.9 liters (one gallon) per 0.1 square meter (one square foot) twice a week. To harden the crop before shipment, water is reduced slowly by unit volume for a three to a four-day span.

Within three weeks, a root depth of 1.2 centimeters (0.5 inch) to 2.5 centimeters (about one inch) is established with a shoot height between 1.2 centimeters (0.5 inch) to 5.1 centimeters (about two inches). The product is then ready for shipment to a specific job site for installation.

Step 4: Shipping.

About 9.1 meter (30 feet) sections are cut, shaken lightly to remove any bonded aggregates and lifted to a trailer for transport. The aggregate stays at the greenhouse or other growing facility. The blanket is watered and tarped to prevent moisture loss and damage caused by wind and shipped to a site. The live, prevegetated blanket is installed following all standard installation methods.

Step 5: Installation.

Installation practices follow erosion control blanket standards.

In conclusion, installing a prevegetated erosion control blanket is easier and faster to install with immediate vegetation and is aesthetically more complete visually for a compliance sign off, required for payment on construction projects.

In the following examples, which are intended to illustrate without unduly limiting the scope of this invention, all parts and percentages are by weight unless otherwise indicated.

Example 1

A drainage ditch is designed to carry parking lot water as runoff to a wet detention area. Grading is done to create a swale to carry water to a crested wetland. Under permits and an engineering plan, the site is seeded. Then an applied erosion control measure or blanket is applied to secondarily protect the seed of a specified plant from moving or eroding under the blanket.

About one week later about one inch of rain, washes away the seed, because there are no growing roots from seed to prevent the washing away or erosion. After a month, the crop of annual weeds appears, and new seed plants are forced out because of compaction or competition.

Example 2

The procedure of Example 1 is repeated, except that a live prevegetated blanket using the same seed as Example 1, replaces the seed and the blanket of Example 1. About one week later about one inch of rain, leaves the seed intact, because there are growing roots from seed to prevent erosion. After a month, the crop of new seed plants is well settled, and the annual weeds common to the area are absent. The use of the live prevegetated blanket provides the successful end result of this example.

This application—taken as a whole with the abstract, specification, claims, and drawings—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A method of forming and transporting a prevegetated blanket comprising sequentially:
   a) providing an aggregate base about 10 centimeters to 33 centimeters thick to provide weed reduction;
   b) laying at least one erosion control blanket on the aggregate;
   c) providing at least one growing medium to a surface of the at least one erosion control blanket at a thickness of about 0.3 to about 1.9 centimeters;
   d) applying a desired seed mix to the at least one growing medium;
   e) applying a fertilizer to the desired seed mix on the at least one growing medium to form an assembly;
   f) applying water to the assembly to form the prevegetated blanket;
   g) separating the prevegetated blanket from the aggregate base to form a separated prevegetated blanket;
   h) cutting the separated prevegetated blanket to form cut prevegetated blankets each sized and configured to fit in stackable trays;
   i) placing each cut separated prevegetated blanket in a stackable tray to form a stackable tray assembly;
   j) forming at least two of the stackable tray assemblies; and
   k) forming a stack of the stackable tray assemblies.

2. The method of claim 1 further comprising:
   a) shaking each cut prevegetated blanket prior to forming the stackable tray assembly to remove any bonded aggregates;
   b) lifting the stack of the stackable tray assemblies to a trailer for transport;
   c) watering the stack of stackable tray assemblies containing the prevegetated blankets;
   d) covering the stack of stackable tray assemblies with a tarp to prevent moisture loss and damage; and
   e) shipping at least one stack of stackable tray assemblies to a site.

3. The method of claim 2 further comprising:
   a) separating the prevegetated blankets from the stackable tray assemblies at the site;
   b) installing the prevegetated blankets at the site; and
   c) combining a plurality of the prevegetated blankets to form at least one erosion control blanket as a fibrous structure impregnated with a water retaining composition, impregnated with a water retention substance and having topsoil therein or thereon.

4. The method of claim 3 further comprising:
   a) watering the prevegetated blanket at a rate of one liter to three liters per square meter after the growing medium, the seed mix, and the fertilizer have been applied;
   b) growing the seed mix in the prevegetated blanket; and
   c) allowing a set of preformed roots to be established from the growing seed mix prior to transport to the site for installation.

5. The method of claim 4 further comprising:
   a) installing the prevegetated blanket with the set of preformed roots at the site to provide a living plant matrix thereon; and
   b) permitting the set of preformed roots to become established at the site in about two days after installation.

6. The method of claim 5 further comprising:
   a) hardening the prevegetated blankets by reducing water for the prevegetated blankets before shipping; and
   b) securing a series of the prevegetated blankets in a desired position on the site to create an erosion control blanket therefrom.

7. The method of claim 6 further comprising:
   a) overlapping the prevegetated blankets with adjoining prevegetated blankets prior to securing the series of blankets to the site;
   b) providing a root space in each tray of the stack of trays during the shipment;
   c) stacking the stack of stackable trays for shipping; and
   d) allowing water to run down the prevegetated blanket, without eroding same after installation due to the overlapping of the prevegetated blankets at an installation site.

8. The method of claim 6 further comprising:
   a) tucking an edge of a prevegetated blanket without an adjoining prevegetated blanket at the site; and
   b) providing the aggregate as substantially smooth, round stones, with a diameter of about 0.6 centimeters to about 2.5 centimeters to prevent root growth resistance before the at least one erosion control blanket is placed on the aggregate.

9. The method of claim 8 further comprising:
   a) the stack of trays being made from up to 24 trays for storage; and
   b) the prevegetated blanket being formed larger than the tray and cut to fit the tray or shaped prior to the shipping.

10. The method of claim 8 further comprising:
    a) the stack of trays being made of up to 10 trays for transport;
    b) the fibrous pad being 4 millimeters to 14 millimeters thick; and
    c) the prevegetated blanket being formed larger than the tray and cut to fit the tray or shaped prior to the shipping.

11. A method of forming and transporting a prevegetated blanket comprising sequentially:
    a) providing an aggregate base about 10 centimeters to 33 centimeters thick to provide weed reduction;
    b) laying at least one erosion control blanket on the aggregate;
    c) providing at least one growing medium to a surface of the at least one erosion control blanket at a thickness of about 0.3 to about 1.9 centimeters;
    d) applying a desired seed mix to the at least one growing medium;
    e) applying a fertilizer to the desired seed mix on the at least one growing medium to form an assembly;
    f) applying water to the assembly to form the prevegetated blanket;
    g) separating the prevegetated blanket from the aggregate base;
    h) cutting the prevegetated blanket;
    i) placing each cut prevegetated blanket in a stackable tray after the cutting;
    j) forming at least two of the stackable trays into a tray assembly;
    k) forming a stack of tray assemblies;
    l) shaking each prevegetated blanket with the stackable tray prior to forming the tray assembly to remove any bonded aggregates;
    m) lifting the stack of the tray assemblies to a trailer for transport;
    n) watering the stack of the tray assemblies;
    o) covering the stack of the tray assemblies with a tarp to prevent moisture loss and damage; and
    p) shipping the stack of the tray assemblies to a site.

* * * * *